(12) United States Patent  (10) Patent No.: US 9,796,230 B1
Buckner  (45) Date of Patent: Oct. 24, 2017

(54) HITCH CLIP LOCKABLE SAFETY COVER

(71) Applicant: James A. Buckner, Clinton Township, MI (US)

(72) Inventor: James A. Buckner, Clinton Township, MI (US)

( * ) Notice: Subject to any disclaimer, the term of this patent is extended or adjusted under 35 U.S.C. 154(b) by 0 days.

(21) Appl. No.: 15/392,814

(22) Filed: Dec. 28, 2016

(51) Int. Cl.
*B60D 1/28* (2006.01)
*B60D 1/60* (2006.01)
*B60D 1/52* (2006.01)

(52) U.S. Cl.
CPC ............... *B60D 1/605* (2013.01); *B60D 1/52* (2013.01)

(58) Field of Classification Search
CPC ............. B60D 1/52; B60D 1/60; B60D 1/605
USPC .......................................................... 280/507
See application file for complete search history.

(56) References Cited

U.S. PATENT DOCUMENTS

| | | | | |
|---|---|---|---|---|
| 3,884,055 | A | * 5/1975 | Vuillemot | B60D 1/60 280/507 |
| 6,802,523 | B1 | * 10/2004 | Profitt | B60D 1/025 280/432 |
| 2002/0073746 | A1 | * 6/2002 | Wyers | B60D 1/52 70/34 |
| 2006/0186639 | A1 | * 8/2006 | Rosario | B60D 1/065 280/507 |
| 2007/0108732 | A1 | * 5/2007 | Silva, II | B60D 1/60 280/507 |
| 2008/0093823 | A1 | * 4/2008 | Pratchler | B60D 1/065 280/507 |
| 2012/0200067 | A1 | * 8/2012 | Bonham | B60D 1/60 280/507 |
| 2012/0212000 | A1 | * 8/2012 | Wen Chun | B60D 1/02 292/164 |
| 2014/0327228 | A1 | * 11/2014 | Laurer | B60D 1/241 280/506 |
| 2016/0229241 | A1 | * 8/2016 | Su | B60D 1/60 |

* cited by examiner

*Primary Examiner* — Tony H. Winner
(74) *Attorney, Agent, or Firm* — L.C. Begin & Associates, PLLC.

(57) ABSTRACT

A safety device 100 for a hitch assembly 10 is provided, the safety device 100 containing a cover member or hitch clip 20 for securing a retainer pin 18 of the hitch assembly 10.

15 Claims, 7 Drawing Sheets

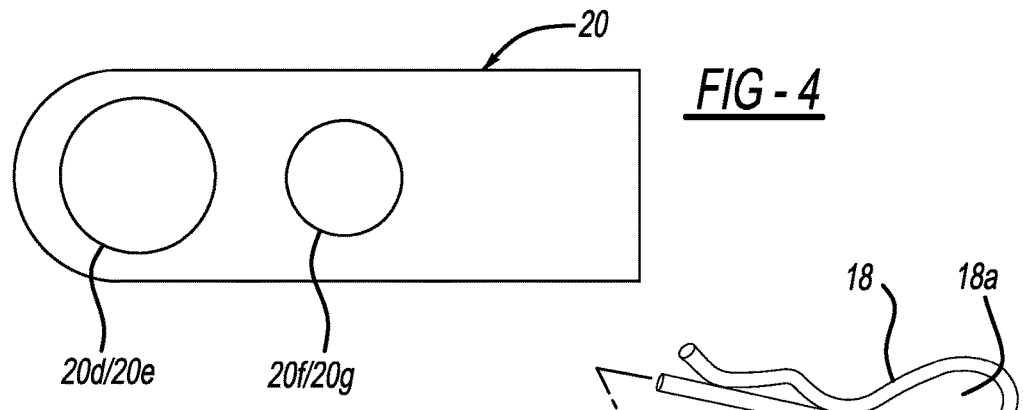
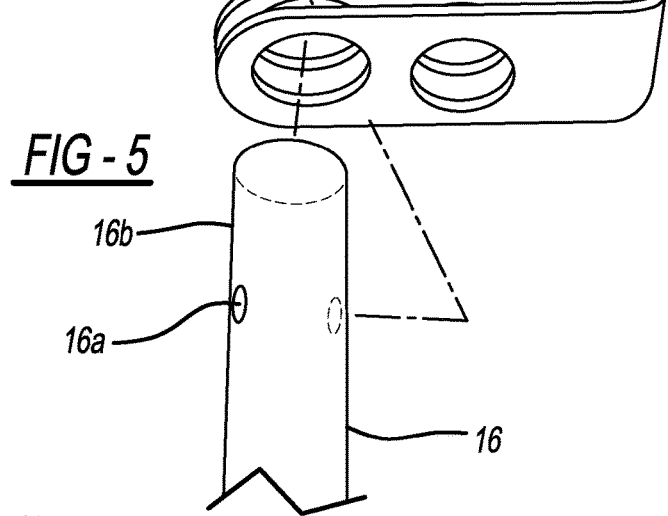
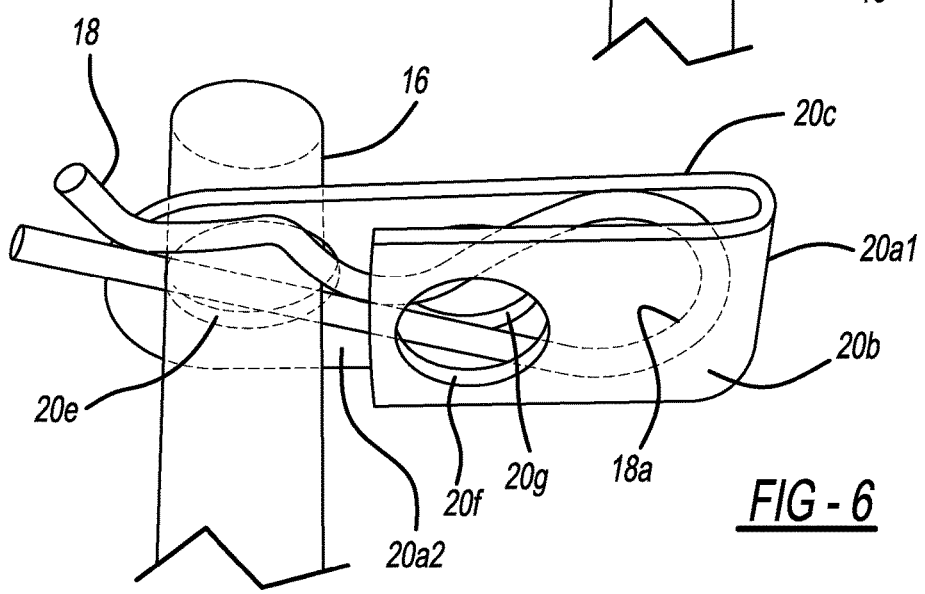

HITCH CLIP LOCKABLE SAFETY COVER

TECHNICAL FIELD

The present invention relates generally to a safety cover for a hitch assembly that enhances the safety of the hitch assembly by means of a locking system.

BACKGROUND OF THE INVENTION

The present invention relates to a device for securing a tow hitch to the receiver on a vehicle. In many instances, a tow hitch may be received within a female channel or receiver on a vehicle. Typically, the hitch is secured by coaxially aligning a pair of holes in the sides of the receiver with a second pair of holes in the hitch. As the male member or hitch is slidably received within the female member or receiver, the holes are aligned and then a hitch pin is inserted within the holes.

One challenge with this type of design is that if left unattended, the hitch pin may be removed if not locked in place. At least one cotter pin or retention pin is typically used to secure the hitch pin within both the receiver and the hitch. If, however, the cotter pin is removed, the possibility exists that the hitch pin might either be removed, or, that the hitch pin might over time vibrate to place the hitch in an unsecured state. The present invention is directed to responding to this challenge, thereby ensuring that the hitch pin stays in place during operation of an associated vehicle and load, for example. Furthermore, certain hitch assemblies containing a hitch and a receiver are not securable and therefore may permit the theft of unauthorized release of a load that is otherwise attached to an associated vehicle.

SUMMARY OF THE INVENTION

Accordingly, it is a principal object of the invention herein to provide a safety device resulting in an improved hitch assembly containing a safety cover.

In general, a hitch assembly of a vehicle contains a perforate receiver bolted or otherwise attached to a vehicle. A first aperture and a second aperture of a first pair of coaxially aligned apertures are formed in a first pair of corresponding sides of the perforate receiver. A perforate hitch member is sized to be slidably received by the receiver. A third aperture and a fourth aperture of a second pair of coaxially aligned apertures are formed in a second pair of corresponding sides of the hitch member. When installed, the hitch member is slidably received within the receiver or over the receiver such that all four apertures are coaxially aligned.

A hitch pin or a primary pin slidably extends through all four apertures to hold the hitch member and the receiver together. At least one channel is formed in the hitch pin wherein the channel extends through a cross-section of the hitch pin. A retainer pin is slidably received within the first channel such that the hitch pin is retained in position to thereby secure the union of the receiver and the hitch member.

A perforate hitch clip or cover member is adapted to slidably engage the hitch pin. A gap, having a closed end and an open end, is formed between two overlying planar members or arms of the cover member. A fifth aperture is formed in a first planar member or arm, and a sixth aperture is formed in a second planar member or arm of the cover member, such that the fifth and sixth apertures are substantially coaxially aligned. At least one additional aperture, a seventh aperture is formed in the first planar member and is respectively spaced from the fifth aperture. If desired, an eighth aperture may be formed in the second planar member, such that the seventh and eighth apertures are also coaxially aligned.

When assembled with the hitch assembly, the safety device is integrated with the hitch pin of the hitch assembly. In one embodiment, the fifth and sixth apertures are slidably received over the hitch pin, and then the retainer pin is slidably engaged within the first channel, thereby securing the cover member between the receiver/hitch member and the retainer pin. The cover member is then revolved about the hitch pin to a position that results in the first and second planar members covering the retainer pin. A loop within the retainer pin may be coaxially aligned with the fifth and sixth apertures such that a locking device may be inserted through the loop and the fifth and sixth apertures. In this way, the retainer pin is locked and easy access to the retainer pin is prevented, thereby ensuring that the retainer pin is not easily removed, and also ensuring that the security of a load on the hitch assembly, such as a trailer, is relatively assured.

More broadly, the present invention may be described as a perforate hitch assembly containing a receiver and a hitch member, the hitch assembly further containing a perforate hitch pin integrating the perforate hitch member and perforate receiver, a retainer pin securing the perforate hitch pin to the perforate hitch assembly, and, a cover for covering and securing the retainer pin to the perforate hitch pin.

Yet further, the present invention may be described as a safety device for a hitch assembly, the safety device containing a cover member or hitch clip containing a first arm, and a second arm spaced apart from the first arm, thereby defining a gap between the first and second planar members or arms, the gap having an open end and a closed end, wherein the closed end is formed by the union of the first and second members or arms.

The foregoing and other objects and features herein will be readily understood from the following description of the invention and the claims, taken together with the drawings.

BRIEF DESCRIPTION OF THE DRAWINGS

FIG. 4 is a side view of the safety cover of FIG. 2.

FIG. 5 is an exploded view of the hitch pin, retainer pin, and cover member interface of the embodiment of FIG. 1, in accordance with the present invention.

FIG. 6 is a perspective view of a second embodiment of the present invention.

DETAILED DESCRIPTION OF THE INVENTION

Figure 1:
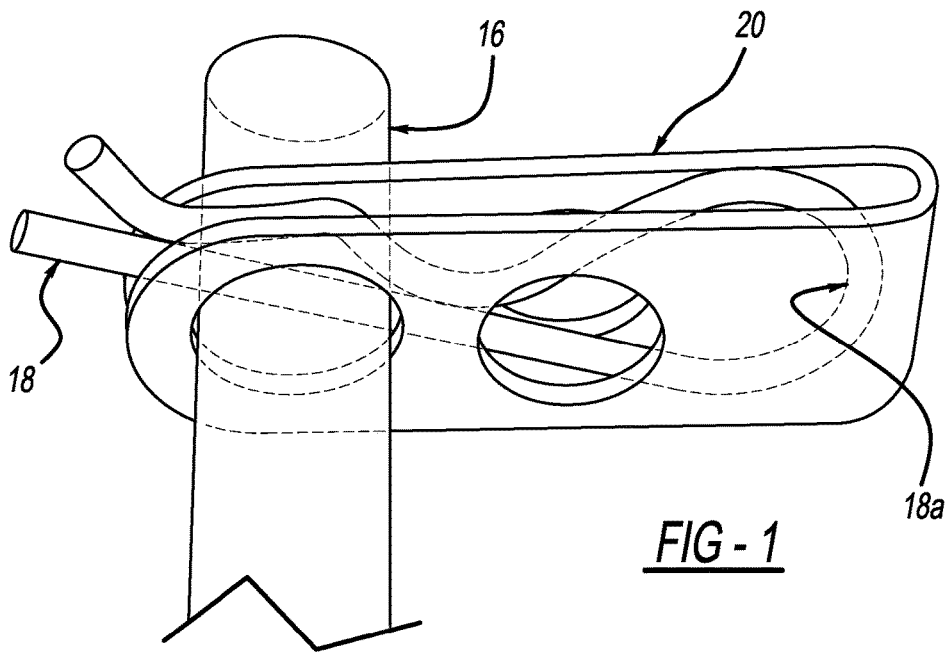
FIG. 1 is a perspective view of a first embodiment of the present invention, illustrating the safety cover encasing the hitch pin clip.
Figure 2:
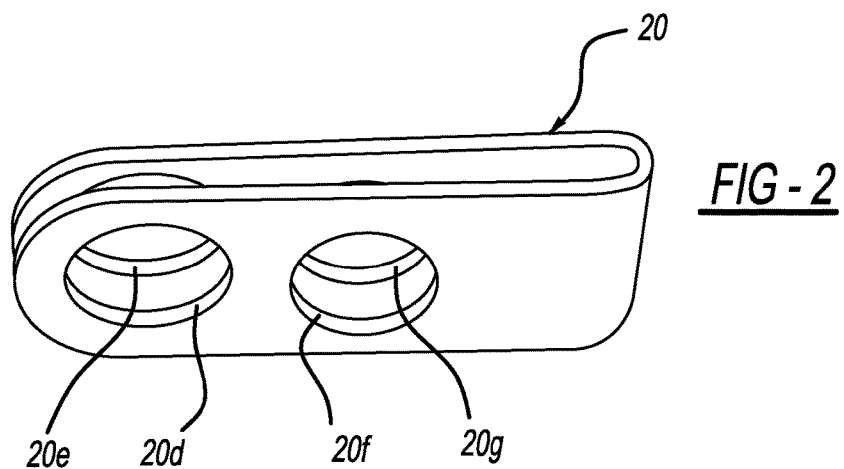
FIG. 2 is a perspective view of a safety cover of the present invention of FIG. 1.
Figure 3:
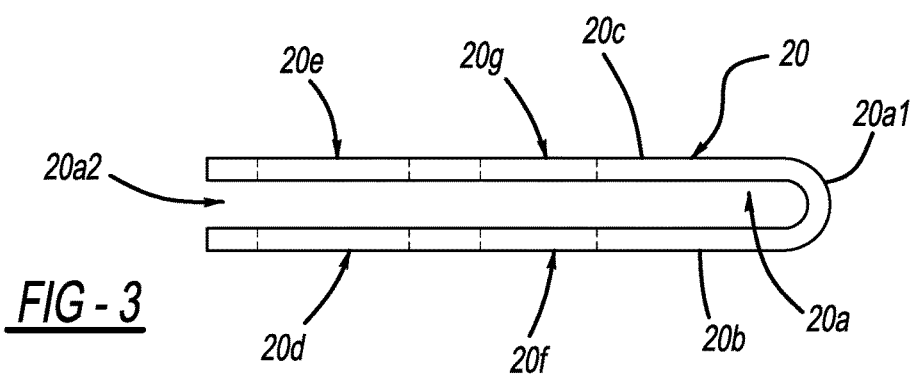
FIG. 3 is a top view of a safety cover of the present invention.

With reference to FIGS. 1-10, 14, and 15, exemplary embodiments of a safety device or a hitch clip lockable safety cover 100 is provided.

A novel vehicle hitch assembly 10, in accordance with the present invention, contains a perforate receiver 12 bolted, welded, or otherwise attached to a vehicle. A first aperture 12a and a second aperture 12b of a first pair of coaxially aligned apertures are formed in a first pair of corresponding sides 12c/12d of the perforate receiver 12. A perforate hitch member 14 is sized to be slidably received by the receiver 12. It will be appreciated that the hitch member 14 may when assembled with the receiver 12, slide over the outer portion 12e of the receiver 12, or, slide within an interior 12f of the receiver 12. A third aperture 14a and a fourth aperture 14b of a second pair of coaxially aligned apertures are formed in a second pair of corresponding sides 14c/14d of the hitch member. When installed, the hitch member is slidably received within the receiver or over the receiver such that all four apertures 12a, 12b, 14a, and 14b are coaxially aligned. It will be appreciated that the general architecture or geometry of the cross-section of the hitch assembly 10 may be rectangular (thereby resulting in the receiver and the hitch member each having corresponding "sides"), or, if desired, any other cross-sectional shape. In all cases, the apertures still will align when the hitch assembly is assembled as described above.

A hitch pin or a primary pin 16 slidably extends through all four apertures 12a, 12b, 14a, and 14b to hold the hitch member and the receiver together. At least one channel 16a is formed at a first end 16b in the hitch pin 16 wherein the channel 16a extends through a cross-section of the hitch pin 16. A retainer pin 18 containing a finger loop 18a is slidably received within the first channel 16a such that the hitch pin 16 is retained in position to thereby secure the union of the receiver 12 and the hitch member 14.

Figure 7:
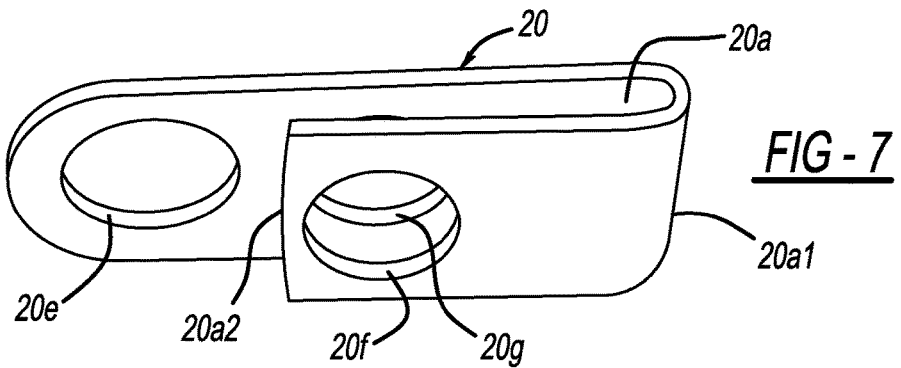
FIG. 7 is a perspective view of a safety cover of the second embodiment of FIG. 6, in accordance with the present invention.

In a first embodiment, a perforate hitch clip or cover member 20 is adapted to slidably engage over exterior portion 16b of the hitch pin 16. A gap 20a having a closed end 20a1 and an open end 20a2, is formed between two overlying arms or planar members 20b/20c of the cover member 20. In this embodiment, a fifth aperture 20f is formed in a first planar member 20b and a sixth aperture 20g is formed in a second planar member 20c of the cover member 20, such that the fifth and sixth apertures 20f and 20g are substantially coaxially aligned. At least one additional aperture, a seventh aperture 20d is formed in the first planar member 20b and is respectively spaced from the fifth aperture 20f. If desired, an eighth aperture 20e may be formed in the second planar member 20c spaced apart from the sixth aperture 20g, whereby seventh aperture 20d is coaxially aligned with eighth aperture 20e, if the eighth aperture 20e is formed in the second planar member 20c. As shown in FIGS. 6 and 7, for example, the first planar member 20b may be longer in length than the second planar member 20c, thereby providing easier access when locking the cover as explained below. It will be appreciated that when one of the legs 20b or 20c is shorter than the other, than one of the apertures 20d or 20e, respectively, would not be formed near the open end 20a2 of the first clip or cover member 20.

As stated above, an eighth aperture 20e may be formed in the second planar member 20c, such that the seventh and eighth apertures 20d and 20e are also coaxially aligned. As shown in FIGS. 1, 2, 3, and 5, for example, the first and the second planar members 20b and 20c may then be of the same length if desired. As compared to the embodiments of FIGS. 6 and 7, the strength of the cover 20 shown in FIG. 5 may be enhanced by including two planar members 20b and 20c having the same length.

Figure 14:
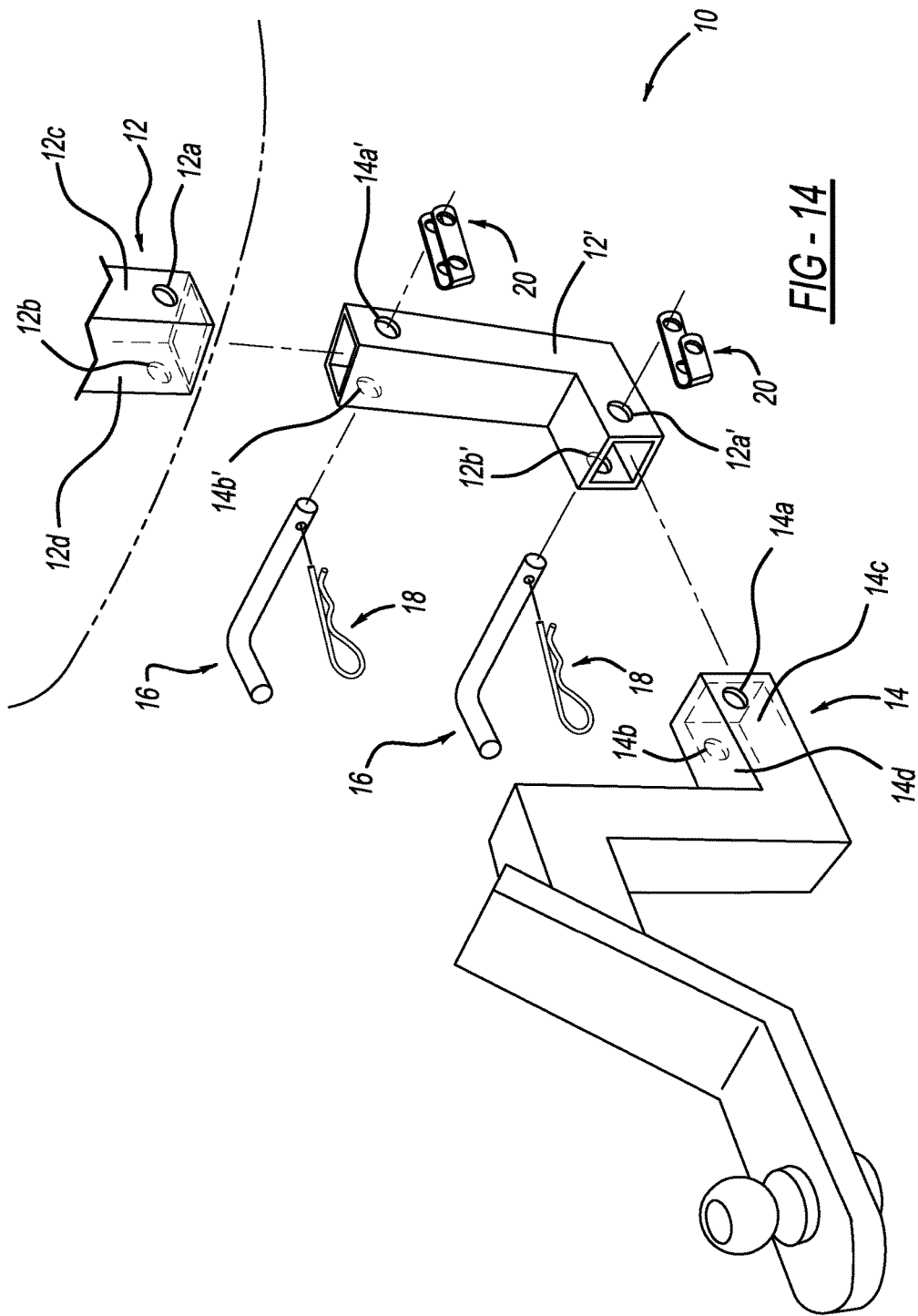
FIG. 14 illustrates a hitch assembly with an exemplary safety device of the present invention.
Figure 15:
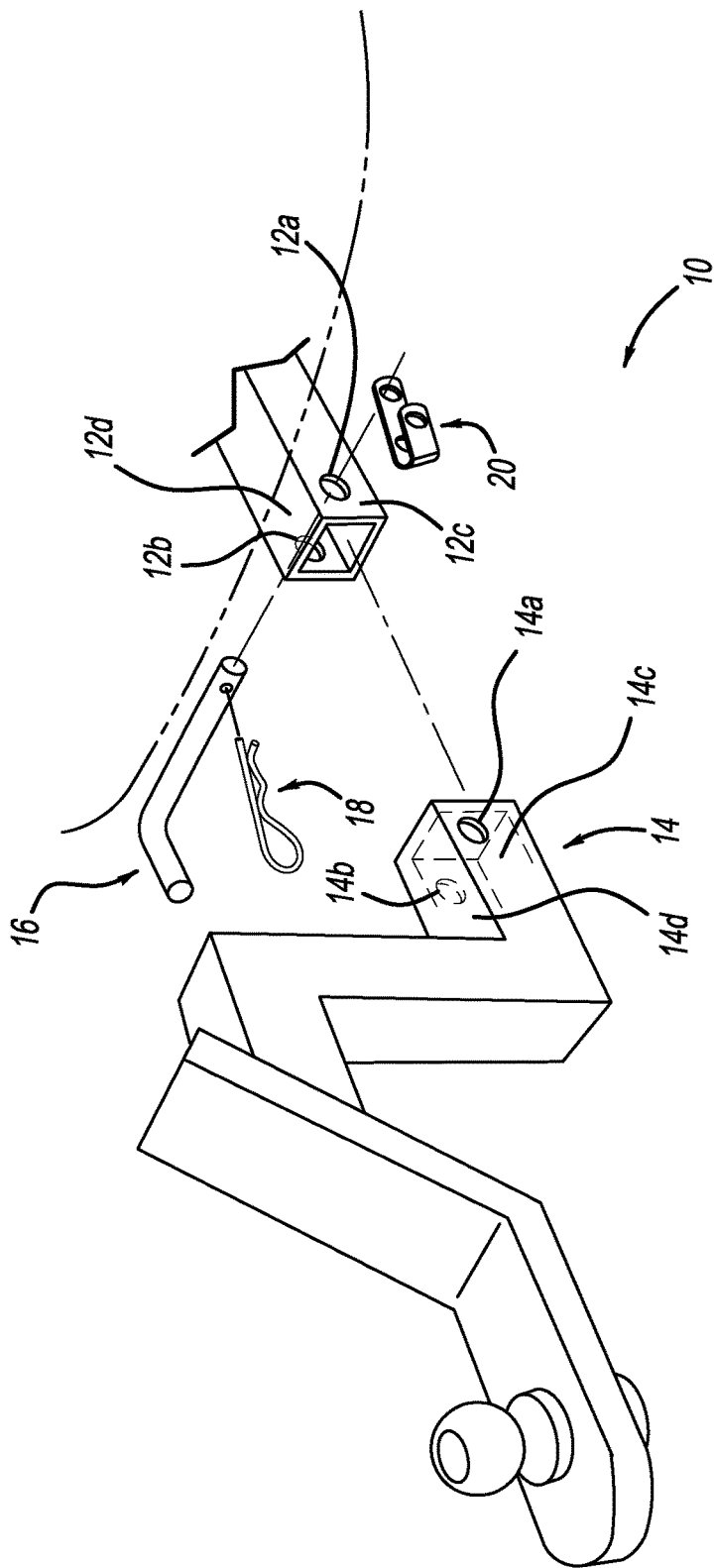
FIG. 15 illustrates a hitch assembly with yet another exemplary safety device of the present invention.

As shown in FIGS. 14 and 15, when assembled with the hitch assembly 10, the safety device 100 is integrated or operably connected with the hitch pin 16 of the hitch assembly 10. In one embodiment, the fifth and sixth apertures 20f and 20g are slidably received over the hitch pin 16, and then the retainer pin 18 is slidably engaged within the first channel 16a, thereby securing the cover member 20 between the receiver/hitch member 12/14 and the retainer pin 18. The cover member 20 may then be rotated about the hitch pin 16 to a position that results in the first and second planar members 20b and 20c at least partially covering the retainer pin 18. A loop 18a within the retainer pin 18 may be substantially coaxially aligned with the seventh aperture 20d and the eighth aperture 20e such that a locking device 22 may be inserted through the loop 18a and the seventh and eighth apertures 20d and 20e. In this way, the retainer pin 18 is locked and easy access to the retainer pin 18 is prevented by virtue of the cover 20, thereby ensuring that the retainer pin 18 is not easily removed, and also ensuring that the security of a load on the hitch assembly 10, such as a trailer, is relatively assured.

Figure 11:
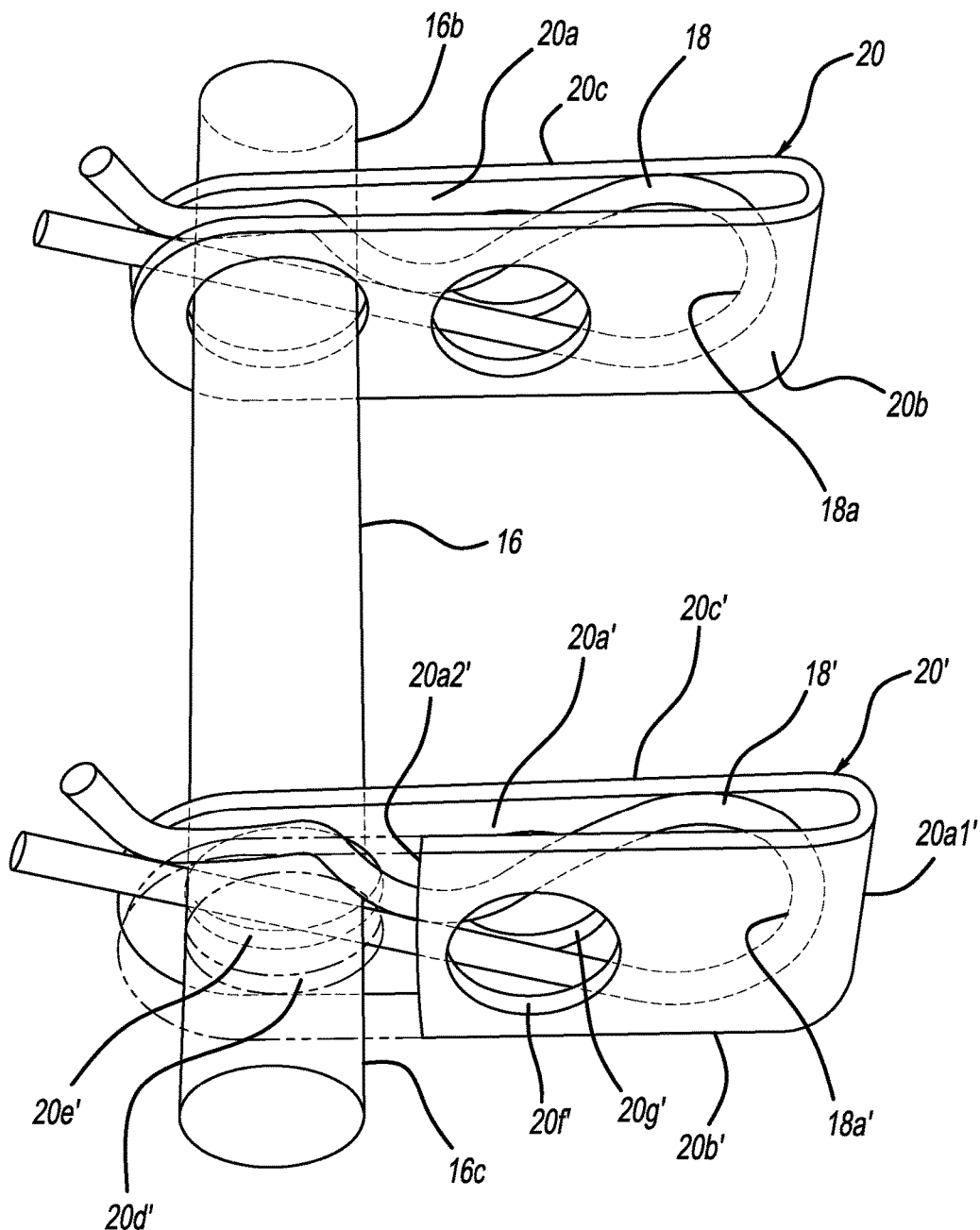
FIG. 11 is a perspective view of a third embodiment containing two cover members as shown in FIG. 1 and FIG. 6.

In a second exemplary embodiment shown in FIG. 11, and as also described above, a first cover 20 may be provided at a first end 16b of the hitch pin 16. A first perforate hitch clip or cover member 20' is adapted to slidably engage over first end or exterior portion 16b of the hitch pin 16. A first gap 20a having a first closed end 20a1 and a first open end 20a2, is formed between two overlying planar members 20b/20c of the cover member 20. In this second embodiment as well, a fifth aperture 20d is formed in the first planar member 20b and a sixth aperture 20e is formed in the second planar member 20c of the cover member 20, such that the fifth and sixth apertures 20d and 20e are substantially coaxially aligned. At least one additional aperture, a seventh aperture 20f is formed in the first planar member 20b and is respectively spaced from the fifth aperture 20d. As indicated in FIG. 11, for example, the first planar member 20b may be longer in length than the second planar member 20c, thereby providing easier access when locking the cover as explained below. It will be appreciated that when one of the legs 20b or 20c is shorter than the other, than one of the apertures 20e or 20f, respectively, would not be formed near the open end 20a2 of the cover member 20.

An eighth aperture 20g may be formed in the second planar member 20c, such that the seventh and eighth apertures 20f and 20g are also coaxially aligned. As shown in FIG. 11, the first and the second planar members 20b and 20c may then be of the same length if desired.

If desired and as also shown in FIG. 11, in the second exemplary embodiment a second cover 20' may be provided at a second end 16c of the hitch pin 16. A second perforate hitch clip or cover member 20' is adapted to slidably engage over second end or exterior portion 16c of the hitch pin 16. A second gap 20a' having a second closed end 20a1' and a second open end 20a2', is formed between two overlying planar members 20b'/20c' of the cover member 20'. A ninth aperture 20f may be formed in a third planar member 20b' and a tenth aperture 20g' is formed in a fourth planar member 20c' of the cover member 20', such that the ninth and tenth apertures 20f and 20g' are substantially coaxially aligned. At least one additional aperture, an eleventh aperture 20d' may be formed in the fourth planar member 20c' and is respectively spaced from the ninth aperture 20f. As shown in FIG. 11, the third planar member 20b' may be shorter in length than the fourth planar member 20c', thereby providing easier access when locking the cover as explained below.

Figure 8:
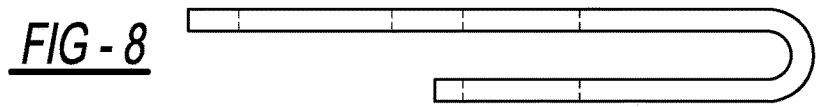
FIG. 8 is a top view of the safety cover of the second embodiment of FIG. 6.
Figure 9:
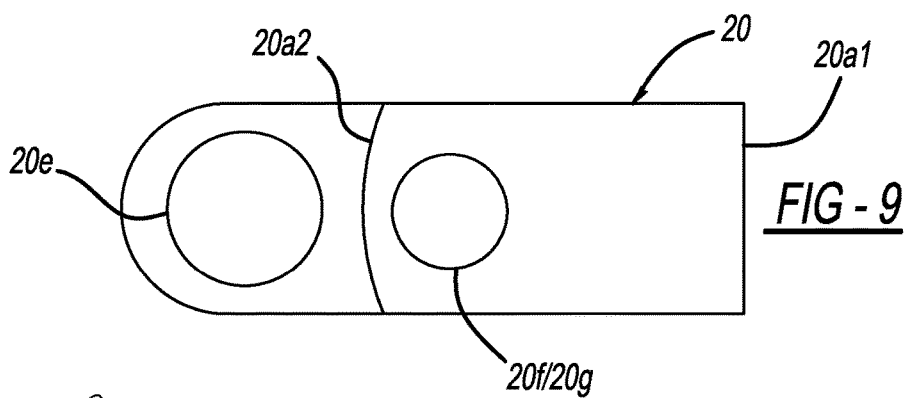
FIG. 9 is a side view of the safety cover of the second embodiment of FIG. 6.
Figure 10:
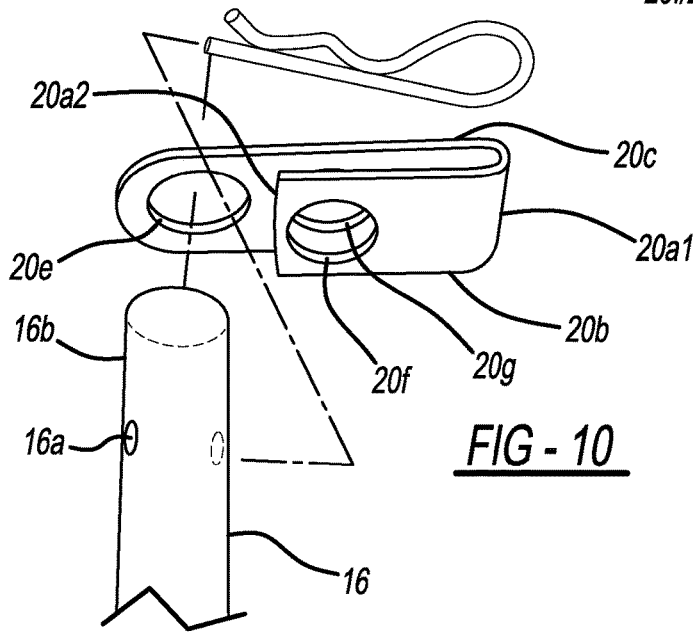
FIG. 10 is an exploded view of the hitch pin, retainer pin, and cover member interface of the embodiment of FIG. 6, in accordance with the present invention.

Alternatively, if desired, a twelfth aperture 20e' may be formed in the third planar member 20b', such that the eleventh and twelfth apertures 20d' and 20e' are also coaxially aligned. As shown in FIG. 8, the third and the fourth planar members 20b' and 20c' may then be of the same length if desired. As compared to the embodiment of FIGS. 6-9, the strength of the covers 20 and 20' shown in FIGS. 2 and 5, for example, may be enhanced by including planar members 20b, 20c, 20b', and 20c' each having substantially the same length, as shown in FIG. 11.

When assembled with the hitch assembly 10, the safety device 100 is integrated or operably connected with the hitch pin 16 of the hitch assembly 10. In the embodiments shown in FIGS. 7 and 8, and FIG. 11, for example, the ninth and tenth apertures 20f' and 20g' are slidably received over the hitch pin 16, and then the second retainer pin 18' is slidably engaged within the second channel 16a', thereby securing the cover member 20' between the receiver/hitch member 12/14 and the retainer pin 18'. The cover member 20' may then be rotated about the hitch pin 16 to a position that results in the third and fourth planar members 2013' and 20c' at least partially covering the retainer pin 18'. A loop 18a' within the retainer pin 18' may be substantially coaxially aligned with the ninth aperture 20f' and the tenth aperture 20g' such that a locking device 22' may be inserted through the loop 18a' and the ninth and tenth apertures 20f' and 20g'. In this way, the retainer pin 18' is locked and easy access to the retainer pin 18' is prevented by virtue of the cover 20', thereby ensuring that the retainer pin 18' is not easily removed, and also ensuring that the security of a load on the hitch assembly 10, such as a trailer, is relatively assured.

Figure 12:
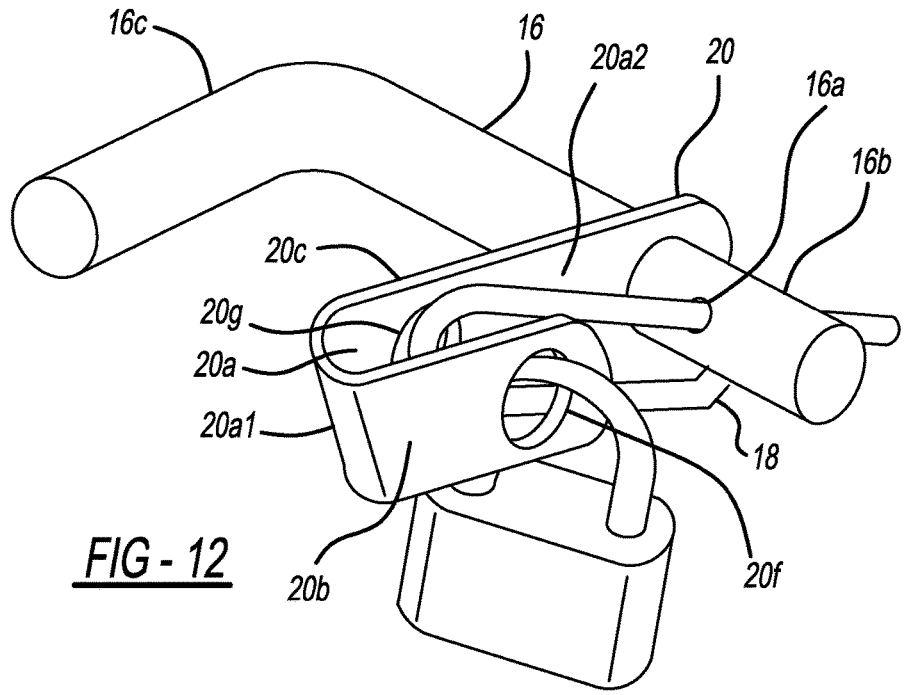
FIG. 12 is a perspective view of an embodiment similar to FIG. 6 containing a lock securing the retainer pin to the cover member, in accordance with the present invention.
Figure 13:
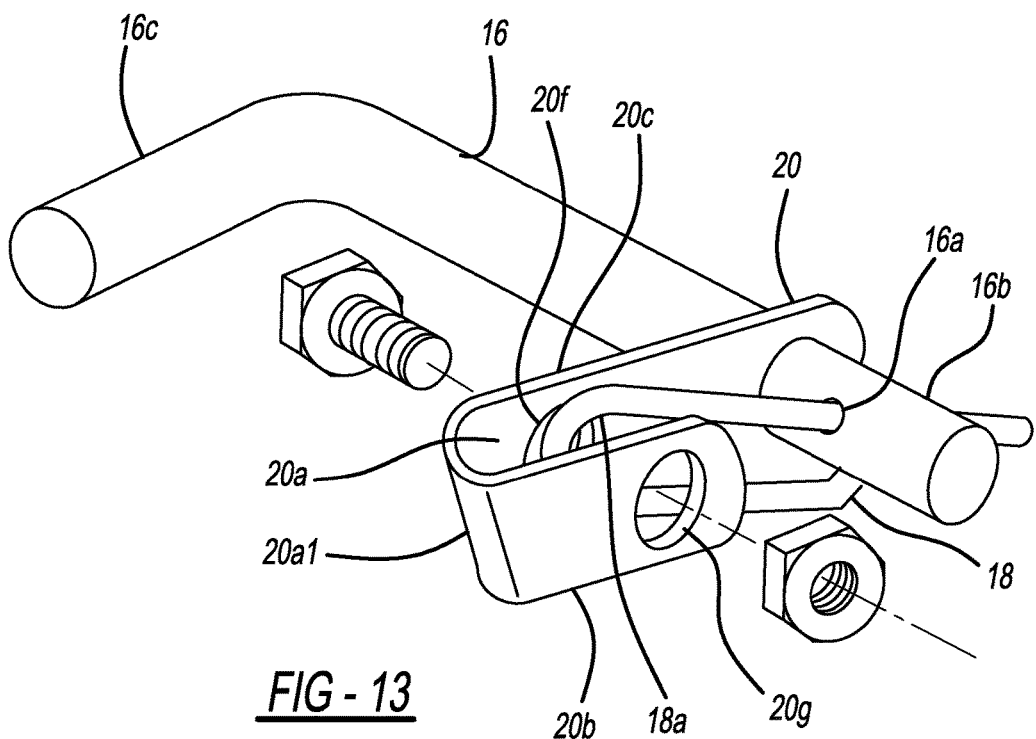
FIG. 13 is a perspective view of an embodiment similar to FIG. 6 containing a nut and bolt for securing the retainer pin to the cover member, in accordance with the present invention.

FIGS. 12 and 13 illustrate locks or securing devices 26 extended through orifices 20f and 20g (or 20f and 20g'), and through the loop 18a or 18a' formed in the retainer pin 18 or 18', and then locked or tightened to secure the cover member 20/20' over the retainer pin 18/18'. FIG. 12 uses a common padlock as the locking device 26 whereas FIG. 13 illustrates that a bolt and nut combination may also constitute the locking device 26. In essence, the locking device 26 essentially must secure the safety cover or hitch clip 20/20' over the retainer pin 18/18'.

In yet another aspect of the invention shown in FIG. 14, a hitch receiver 12 may be connected to an extension member 13, again having a pair of orifices 13a and 13b coaxially aligned with the receiver pair of orifices, 12a and 12b, by slidably engaging the hollow extension member 13 within the receiver 12, or, by slidably engaging the hollow extension member over the receiver 12. A hitch pin 16 may then be slidably received by all four orifices 12a, 12b, 13a, and 13b, and then locked in place by inserting a retainer pin 18 within the channel 16a. As shown in FIG. 14, the extension member 13 contains a first end 13c and a second end 13d, and may be formed in a linear design, or, may be formed with several angular cuts in the body 13e of the extension member 13. As also shown in FIG. 14, the hitch assembly 14 may slidably engage the extension member 13 by sliding a second hitch pin 16' through orifices 14a and 14b, and through a second pair of orifices, 13f and 13g at the second end of the extension member 13. Again, orifices 14a, 14b, 13f, and 13g are all coaxially aligned thereby permitting insertion of the hitch pin 16' through all four orifices. A retainer pin 18' may then be slidably received within a channel 16a' on the hitch pin 16', to thereby lock the hitch pin 16' and secure the extension member 13 to the hitch member 14.

As shown in FIGS. 14 and 15, wherever a retainer pin 18/18' is provided, a safety cover member or hitch clip 20/20' may be provided to lock the retainer pin 18/18' in place and prevent the expedient removal of the retainer pin, thereby enhancing the safety of the overall hitch assembly 10.

In general, the present invention may be described as a safety device 100 for a hitch assembly 10, the safety device 100 containing a cover member or hitch clip 20 containing a first arm 20b and a second arm 20c spaced apart from the first arm 20b, thereby defining a gap 20a between the first and second arms 20b and 20c, the gap 20a having an open end 20a1 and a closed end 20a2, wherein the closed end 20a2 is formed by a union or junction 20j of the first and second arms 20b and 20c. As explained and described above, the safety device 100 may further contain a second cover 20'. As also explained and described above, the arms 20b and 20c (and 20b' and 20c') may be planar in shape, if desired, and may contain a variable number of apertures depending on the design criteria of the safety device.

The various constituents of the present invention and the hitch assembly may be made as known in the art. For example, the hitch assembly receiver and hitch member, and the hitch pin may be cast, drawn, or otherwise metal-formed. The retainer pin may be cast or drawn, for example. The cover member may be stamped or otherwise metal-formed, again as known in the art. The apertures may be formed by drilling or by other methods known in the art.

It should further be understood that the preceding is merely a detailed description of various embodiments of this invention and that numerous changes to the disclosed embodiments can be made in accordance with the disclosure herein without departing from the scope of the invention. The preceding description, therefore, is not meant to limit the scope of the invention. Rather, the scope of the invention is to be determined only by the appended claims and their equivalents.

What is claimed is:

1. A safety device for a hitch, assembly containing a perforate receiver and a perforate hitch member contained within said receiver, said safety device comprising:
   a primary pin containing a first end, a second end, and at least one channel extending through the first end, said primary pin adapted to operably extend through said receiver and said hitch member for retaining the hitch within the receiver;
   a first retainer pin adapted to extend through the first channel; and a first clip containing a first arm spaced apart from a second arm, said first arm containing a first aperture and said second arm containing a second aperture coaxially aligned with said first aperture, and, said first arm containing a third aperture spaced apart from said first aperture, wherein said first retainer pin is operably retained within said first clip when said safety device is secured to said hitch assembly.

2. The safety device of claim 1 wherein said first and second apertures are adapted to receive a lock therethrough.

3. The safety device of claim 1 wherein said second arm is a same length as the first arm, and, said second arm contains a seventh aperture spaced apart from said second aperture, said seventh aperture coaxially aligned with said third aperture.

4. The safety device of claim 1 wherein said hitch pin extends through said third aperture.

5. The safety device of claim 1 wherein the at least one channel further comprises:
a second channel extending through the second end;
a second retainer pin adapted to extend through the second channel;
a second clip containing a third arm spaced apart from a fourth arm, said third arm containing a fourth aperture and said fourth arm containing a fifth aperture coaxially aligned with said fourth aperture, and, said third arm containing a sixth aperture spaced apart from said fourth aperture,
wherein said second retainer pin is operably retained within said second clip when said safety device is secured to said hitch assembly.

6. The safety device of claim 5 wherein said fourth arm is a same length as the third arm, and, said fourth arm contains an eighth aperture spaced apart from said fifth aperture, said eighth aperture coaxially aligned with said sixth aperture.

7. A safety device for a hitch assembly containing a perforate receiver and a perforate hitch member contained within said receiver, said safety device comprising:
a primary pin adapted to extend through said perforate receiver and said perforate hitch member, said primary pin containing a first channel, said first channel extending through said primary pin to form a first opening and a second opening;
a first retainer pin adapted to extend through the first channel and through said first and second openings; and
a first clip adapted to shroud said first retainer pin, wherein said first retainer pin is operably retained within said first clip when said safety device is secured to said hitch assembly.

8. A safety device for a hitch assembly containing a perforate hitch pin and a first retainer clip slidably received by said perforate hitch pin, the safety device comprising:
a hitch clip containing a first arm and a second arm, said first arm spaced apart from the second arm, said first arm and said second arm integrated at a junction connecting both arms;
a gap defined by an interior of said first and second arms, said gap having an open end, and said gap having a closed end at said junction;
a first aperture formed in said first arm and a second aperture formed in said second arm, said first and second apertures in substantial coaxial alignment; and
a third aperture formed in said first arm and spaced apart from said first aperture,
wherein said first and second apertures are adapted to secure said hitch clip over said retainer clip pin, said gap is adapted to receive said first retainer clip, and, said third aperture is adapted to be slidably engaged over said perforate hitch pin.

9. The safety device of claim 8 wherein said retainer clip contains a portion of a loop that that is substantially axially aligned with said first and second apertures, and further contains a securing device that passes through said first and second apertures and through said loop to secure the hitch clip over said retainer pin.

10. The safety device of claim 8 wherein said first arm and said second arm are each planar in shape.

11. The safety device of claim 8 wherein said first arm is longer than said second arm.

12. The safety device of claim 8 wherein said first arm and said second arm are substantially a same length.

13. The safety device of claim 8 wherein said second arm comprises a fourth aperture, said fourth aperture substantially coaxially aligned with said third aperture.

14. The safety device of claim 8 for a hitch assembly further containing a second retainer clip slidably received in said perforate hitch pin, said safety device further comprising:
a second hitch clip containing a third arm and a fourth arm, said third arm spaced apart from the fourth arm, said third arm and said fourth arm integrated at a second junction connecting both third and fourth arms;
a second gap defined by a second interior of said third and fourth arms, said second gap having an open end, and said second gap having a closed end at said second junction;
a fifth aperture formed in said third arm and a sixth aperture formed in said fourth arm, said fifth and sixth apertures in substantial coaxial alignment; and
a seventh aperture formed in said third arm and spaced apart from said fifth aperture,
wherein said fifth and sixth apertures are adapted to lock said second hitch clip over said second retainer clip, said second gap is adapted to receive a second retainer clip, and, said seventh aperture is adapted to slidably engage said perforate hitch pin.

15. The safety device of claim 14 wherein said fourth arm comprises an eighth aperture, said eighth aperture substantially coaxially aligned with said seventh aperture.

* * * * *

UNITED STATES PATENT AND TRADEMARK OFFICE
CERTIFICATE OF CORRECTION

PATENT NO.       : 9,796,230 B1                                  Page 1 of 1
APPLICATION NO.  : 15/392814
DATED            : October 24, 2017
INVENTOR(S)      : Buckner It is certified that error appears in the above-identified patent and that said Letters Patent is hereby corrected as shown below:

In the Specification

Column 5; Line 11; Please delete "20f'" and insert --20f'--.

Column 5; Line 14; Please delete "20f'" and insert --20f'--.

Column 5; Line 17; Please delete "20f'" and insert --20f'--.

Column 5; Line 42; Please delete "2013'" and insert --20b'--.

Column 5; Line 54; Please delete the second occurrence of "20f'" and insert --20f'--.

In the Claims

Column 8; Claim 9; Line 15; Please delete "that" after that.

Signed and Sealed this
Sixth Day of February, 2018

Joseph Matal
*Performing the Functions and Duties of the
Under Secretary of Commerce for Intellectual Property and
Director of the United States Patent and Trademark Office*